United States Patent
Rider et al.

(10) Patent No.: US 9,384,116 B2
(45) Date of Patent: Jul. 5, 2016

(54) GRAPHICALLY REPRESENTING LOAD BALANCE IN A COMPUTING CLUSTER

(75) Inventors: Eric Marshall Rider, San Jose, CA (US); Thomas C. Cannon, III, San Jose, CA (US); Matthew Critchlow, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 432 days.

(21) Appl. No.: 13/108,820

(22) Filed: May 16, 2011

(65) Prior Publication Data

US 2012/0297307 A1    Nov. 22, 2012

(51) Int. Cl.
| | |
|---|---|
| G06F 3/048 | (2013.01) |
| G06F 11/34 | (2006.01) |
| G06F 9/455 | (2006.01) |
| G06F 3/0484 | (2013.01) |
| G06F 11/32 | (2006.01) |
| G06F 9/50 | (2006.01) |

(52) U.S. Cl.
CPC ........ G06F 11/3433 (2013.01); G06F 3/04847 (2013.01); G06F 9/45558 (2013.01); G06F 11/32 (2013.01); G06F 9/5088 (2013.01); G06F 11/3466 (2013.01); G06F 2009/4557 (2013.01); G06F 2201/815 (2013.01)

(58) Field of Classification Search
None
See application file for complete search history.

(56) References Cited

U.S. PATENT DOCUMENTS

| | | | | |
|---|---|---|---|---|
| 6,606,306 B1* | 8/2003 | Lin | ...................... | H04L 12/1813 370/259 |
| 7,574,397 B1* | 8/2009 | Kline | ...................... | G06Q 40/04 705/35 |
| 8,095,929 B1* | 1/2012 | Ji | .......................... | G06F 9/4856 709/223 |
| 8,214,661 B2* | 7/2012 | Cooper | .................. | G06F 1/3221 711/111 |
| 8,365,103 B1* | 1/2013 | Gennari | .............. | G06F 17/5068 716/100 |
| 8,495,611 B2* | 7/2013 | McCarthy | ........... | H04L 41/0806 709/203 |
| 2003/0135087 A1* | 7/2003 | Hickle | ................ | G06F 19/3406 600/26 |
| 2007/0208244 A1* | 9/2007 | Brauker | ............... | A61B 5/1411 600/365 |
| 2008/0163239 A1* | 7/2008 | Sugumar | ............... | G06F 9/5088 718/105 |
| 2009/0168661 A1* | 7/2009 | Lingafelt | ............ | H04L 41/5009 370/252 |

(Continued)

OTHER PUBLICATIONS 2. vSphere Resource Management Guide, 2011, VMware, Inc., www.vmware.com/pdf/vsphere4/r40/vsp_40_resource_mgmt.pdf.

*Primary Examiner* — Ajay Bhatia
*Assistant Examiner* — Haimei Jiang

(57) ABSTRACT

Embodiments provide a graphical representation of load distribution or "balance" in a computing cluster. Load metrics representing the resource utilization of individual host computing devices are collected, and a load imbalance metric representing the variability of the host load metrics is calculated. A graphical balance indicator including a balance position and a boundary is created. An imbalance icon is positioned relative to the balance position and the boundary based on the calculated load imbalance metric. Attributes of the graphical balance indicator, such as the position of the boundary and/or the size of the imbalance icon, may be determined based on an acceptable imbalance threshold value.

20 Claims, 6 Drawing Sheets

(56) References Cited

U.S. PATENT DOCUMENTS

| | | | | |
|---|---|---|---|---|
| 2009/0172666 A1* | 7/2009 | Yahalom | G06F 3/0605 | 718/1 |
| 2009/0237404 A1* | 9/2009 | Cannon, III | G06T 11/206 | 345/440 |
| 2009/0249284 A1* | 10/2009 | Antosz | G06F 8/10 | 717/104 |
| 2010/0070784 A1* | 3/2010 | Gupta | G06F 1/3203 | 713/310 |
| 2010/0097202 A1* | 4/2010 | Watanabe | B60L 11/123 | 340/439 |
| 2010/0211200 A1* | 8/2010 | Kobayashi | G06T 13/205 | 700/94 |
| 2010/0211956 A1* | 8/2010 | Gopisetty | G06F 9/5088 | 718/104 |
| 2010/0269109 A1* | 10/2010 | Cartales | G06F 9/5072 | 718/1 |
| 2010/0313568 A1* | 12/2010 | Davis, Jr. | F23R 3/002 | 60/725 |
| 2010/0332658 A1* | 12/2010 | Elyashev | G06F 9/505 | 709/226 |
| 2011/0022812 A1* | 1/2011 | van der Linden | G06F 9/5077 | 711/163 |
| 2011/0093030 A1* | 4/2011 | Goetz | A61N 1/0553 | 607/17 |
| 2011/0113638 A1* | 5/2011 | Scheyer | G01C 9/28 | 33/379 |
| 2012/0036515 A1* | 2/2012 | Heim | G06F 9/5088 | 718/105 |
| 2012/0042312 A1* | 2/2012 | Isci | G06F 1/3203 | 718/1 |
| 2012/0066031 A1* | 3/2012 | Chao | G06Q 10/00 | 705/7.39 |
| 2012/0072910 A1* | 3/2012 | Martin | G06F 9/45533 | 718/1 |
| 2012/0159370 A1* | 6/2012 | Rode | G01G 23/3721 | 715/772 |
| 2012/0221730 A1* | 8/2012 | Oba | G06F 9/5077 | 709/226 |
| 2012/0324444 A1* | 12/2012 | Gulati et al. | | 718/1 |
| 2013/0096720 A1* | 4/2013 | Brey | G06F 1/3206 | 700/276 |
| 2013/0218547 A1* | 8/2013 | Ostermeyer | G06F 17/5009 | 703/13 |
| 2014/0298137 A1* | 10/2014 | Dhuse | G06F 11/1076 | 714/763 |

\* cited by examiner

GRAPHICALLY REPRESENTING LOAD BALANCE IN A COMPUTING CLUSTER

BACKGROUND

Software applications, such as virtual machines (VMs), may be executed by a group, or "cluster," of host computing devices. Each VM creates an abstraction of physical computing resources, such as a processor and memory, of the host executing the VM and executes a "guest" operating system, which, in turn, executes one or more software applications. The abstracted resources may be functionally indistinguishable from the underlying physical resources to the guest operating system and software applications.

The amount of computing resources allocated to each VM on a host can be designated manually by an administrator of the cluster and/or automatically according to resource policies set by the administrator. In some clusters, an operator attempts to uniformly distribute, or "balance," the use of computing resources, also known as the computing "load," across multiple hosts. For example, cluster monitoring software may be used to monitor the load on hosts in the cluster and present load information to a user. The load information presented may include statistics, such as the load of each host in the cluster, an average load of hosts in the cluster, and/or a standard deviation of the loads in the cluster. Further, such software may determine and present load balancing recommendations, such as a recommendation that a VM be migrated from a host with a high load to a host with a lower load.

SUMMARY

One or more embodiments described herein provide a graphical representation of load balance in a computing cluster. Load metrics representing the resource utilization of individual host computing devices are collected, and a load imbalance metric is calculated based on the load metrics. The load imbalance metric represents the variability of the load metrics. A graphical balance indicator including a balance position (e.g., a center) and a boundary is created. An imbalance icon is positioned relative to the balance position and the boundary based on the calculated load imbalance metric. For example, if the load imbalance metric is equal to zero, the imbalance icon may be positioned at the balance position. Attributes of the graphical balance indicator, such as the position of the boundary and/or the size of the imbalance icon, may be determined based on an acceptable imbalance threshold value, such that the imbalance icon is positioned beyond the boundary when the calculated load imbalance metric exceeds the acceptable imbalance threshold value.

The graphical balance indicator may be presented in a form similar to a physical tool for determining whether a surface is level, such as a spirit level (e.g., a tubular level or a bull's eye level). Further, an additional boundary may be positioned relatively near the balance position, and a nominal imbalance threshold value may be indicated by positioning the imbalance icon between the balance position and the additional boundary.

This summary introduces a selection of concepts that are described in more detail below. This summary is not intended to identify essential features, nor to limit in any way the scope of the claimed subject matter.

DETAILED DESCRIPTION

Embodiments described herein provide a graphical representation of the distribution of computing resource loads in a computing cluster. In exemplary embodiments, a load imbalance metric (e.g., a standard deviation) is calculated based on host load metrics corresponding to individual hosts in the cluster. The load imbalance metric is represented by an imbalance icon, whose position within a balance indicator is based on the load imbalance metric. For example, a balance position of the balance indicator may represent a standard deviation of zero, and a boundary that is offset from the balance position may represent an acceptable standard deviation. In such an example, the position of the imbalance icon relative to the balance position and the boundary indicates the calculated standard deviation with respect to the acceptable standard deviation. The balance indicator may be repeatedly updated, such that changes in load balance over time are indicated to a user.

Figure 1:
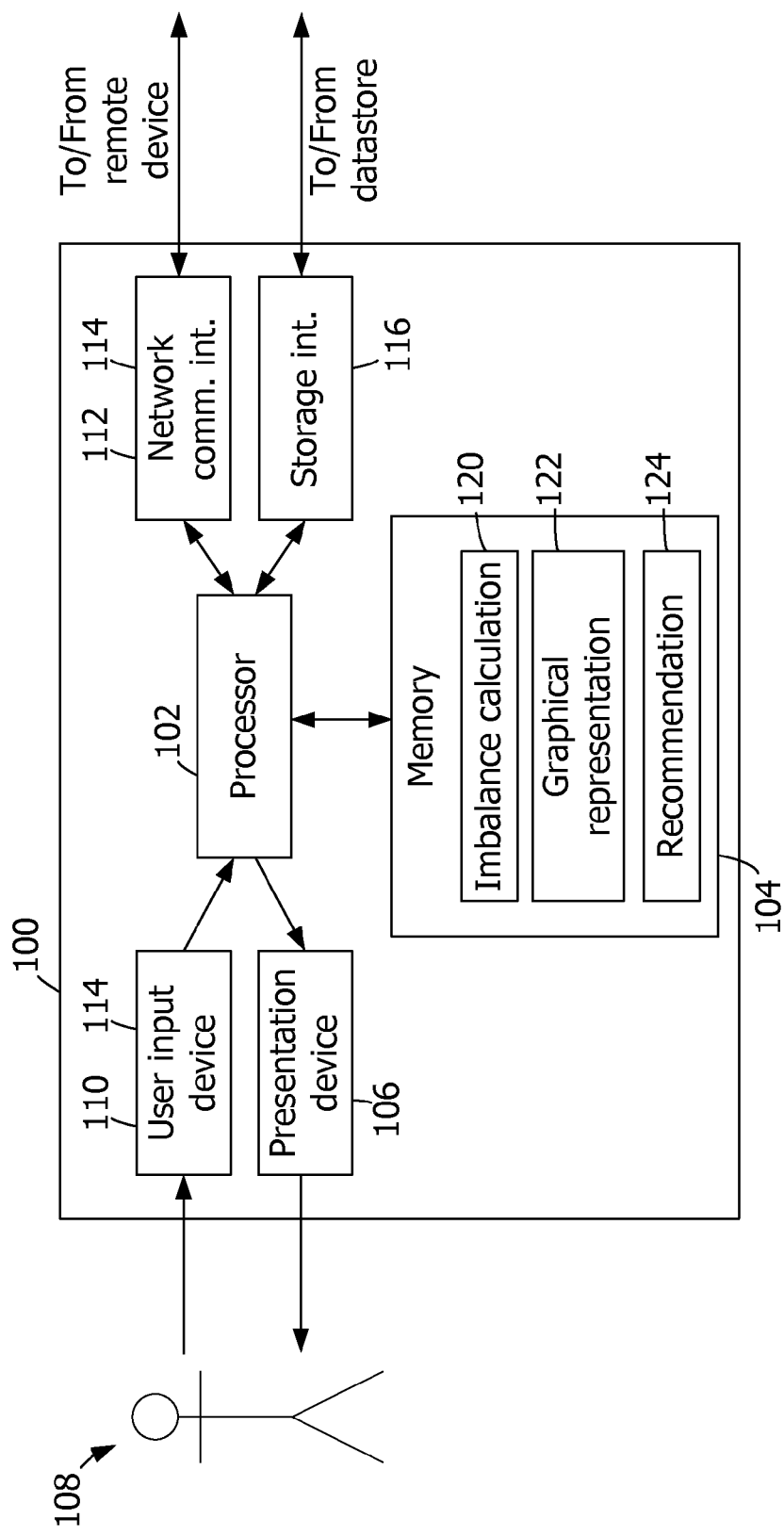
FIG. 1 is a block diagram of an exemplary computing device.

FIG. 1 is a block diagram of an exemplary computing device 100. Computing device 100 includes a processor 102 for executing instructions. In some embodiments, executable instructions are stored in a memory 104. Memory 104 is any device allowing information, such as executable instructions, host load metrics, load imbalance metrics, load balancing recommendations, configuration options (e.g., threshold values), and/or other data, to be stored and retrieved. For example, memory 104 may include one or more random access memory (RAM) modules, flash memory modules, hard disks, solid state disks, and/or optical disks.

Computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

The computing device 100 may include a user input device 110 for receiving input from user 108. User input device 110 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 106 and user input device 110.

Computing device 100 also includes a network communication interface 112, which enables computing device 100 to communicate with a remote device (e.g., another computing device 100) via a communication medium, such as a wired or wireless packet network. For example, computing device 100 may transmit and/or receive data via network communication interface 112. User input device 110 and/or network communication interface 112 may be referred to as an input interface 114 and may be configured to receive information, such as configuration options (e.g., threshold values) and/or selections of recommendations, from a user.

Computing device 100 further includes a storage interface 116 that enables computing device 100 to communicate with one or more datastores. In exemplary embodiments, storage interface 116 couples computing device 100 to a storage area network (SAN) (e.g., a Fibre Channel network) and/or to a network-attached storage (NAS) system (e.g., via a packet network). The storage interface 116 may be integrated with network communication interface 112.

In exemplary embodiments, memory 104 stores computer-executable instructions for performing one or more of the operations described herein. Memory 104 may include one or more computer-readable storage media that have computer-executable components embodied thereon. In the example of FIG. 1, memory 104 includes an imbalance calculation component 120, a graphical representation component 122, and a recommendation component 124.

When executed by processor 102, imbalance calculation component 120 causes processor 102 to calculate a load imbalance metric based on a plurality of host load metrics. Each host load metric corresponds to a host of a plurality of hosts and represents a computing resource utilization of the corresponding host. When executed by processor 102, graphical representation component 122 causes processor 102 to create a graphical balance indicator including a balance position that represents a load imbalance metric of zero and a boundary that is offset from the balance position. Graphical representation component 122 also causes processor 102 to position an imbalance icon in the graphical balance indicator relative to the balance position and the boundary based on the calculated load imbalance metric. The position of the imbalance icon represents a proximity of the calculated load imbalance metric to an acceptable imbalance threshold value. Graphical representation component 122 also causes processor 102 to provide the graphical balance indicator for presentation to a user. When executed by processor 102, recommendation component 124 causes processor 102 to determine a load balancing recommendation when the calculated load imbalance metric exceeds the acceptable imbalance threshold value. The load balancing recommendation indicates a migration of a virtual machine from a first host associated with a first host load metric to a second host associated with a second host load metric that is less than the first host load metric. Recommendation component 124 also causes processor 102 to provide the load balancing recommendation to a user and to apply the load balancing recommendation when the load balancing recommendation is selected by the user. Any portion of the illustrated components may be included in memory 104 based on the function of computing device 100.

Figure 2:
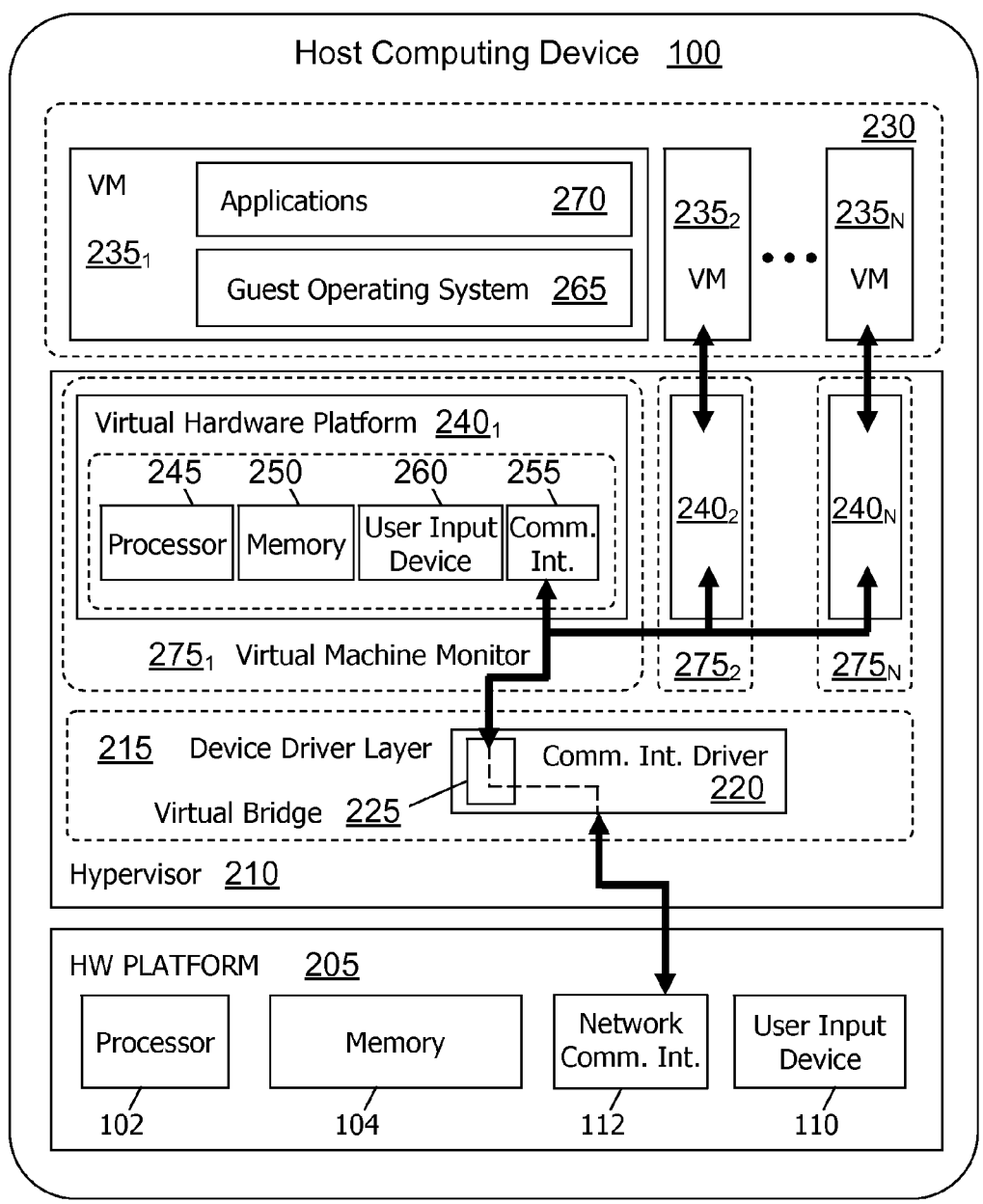
FIG. 2 is a block diagram of virtual machines that are instantiated on a computing device, such as the computing device shown in FIG. 1.

FIG. 2 depicts a block diagram of virtual machines $235_1$, $235_2 \ldots 235_N$ that are instantiated on a computing device 100, which may be referred to as a "host." Computing device 100 includes a hardware platform 205, such as an x86 architecture platform. Hardware platform 205 may include processor 102, memory 104, network communication interface 112, user input device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user input device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user input device 260 and other emulated I/O devices in VM $235_1$).

In some embodiments, memory 250 in first virtual hardware platform $240_1$ includes a virtual disk that is associated with or "mapped to" one or more virtual disk images stored in memory 104 (e.g., a hard disk or solid state disk) of computing device 100. The virtual disk image represents a file system (e.g., a hierarchy of directories and files) used by first virtual machine $235_1$ in a single file or in a plurality of files, each of which includes a portion of the file system. In addition, or alternatively, virtual disk images may be stored in memory 104 of one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ which implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
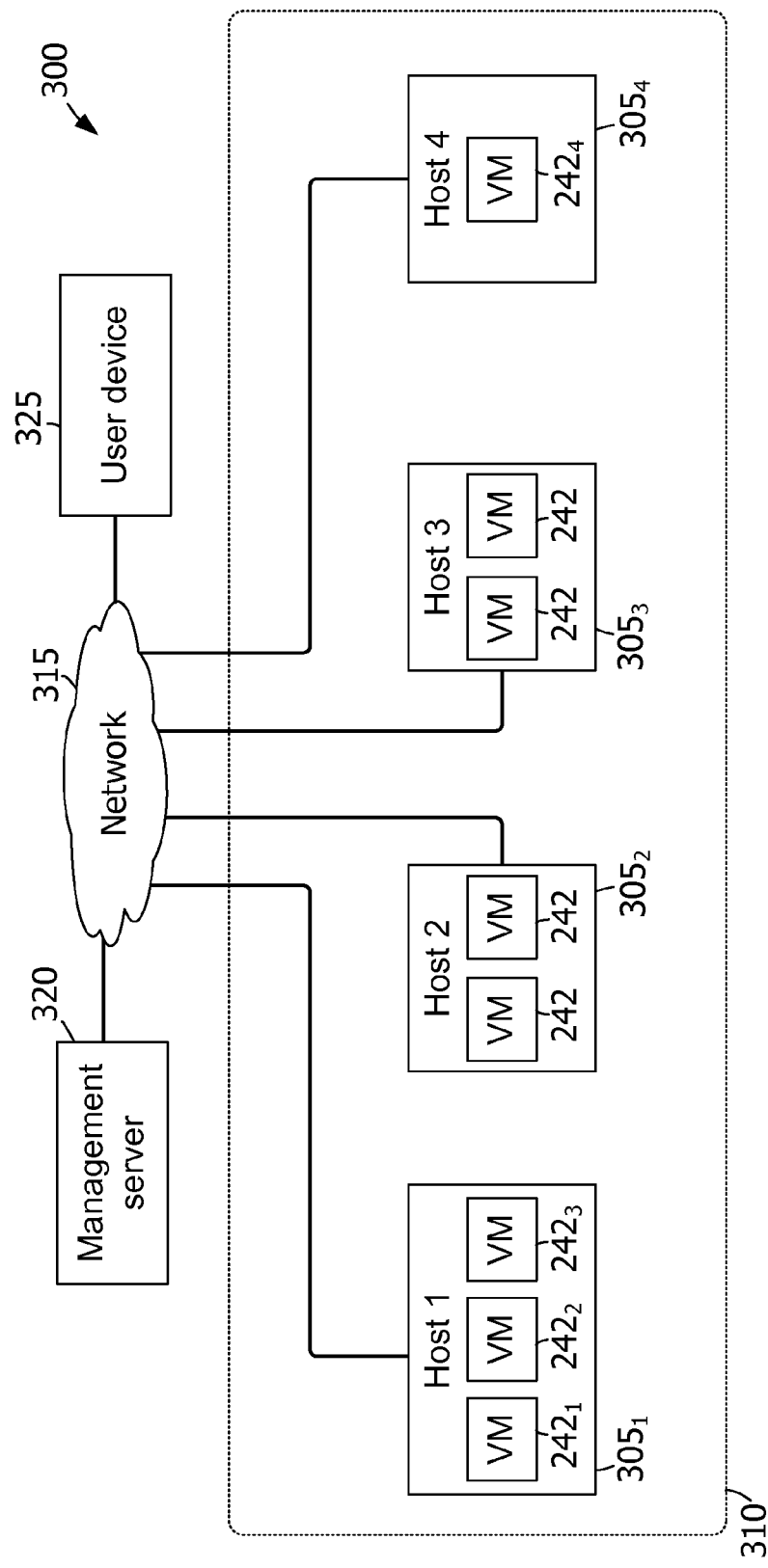
FIG. 3 is a block diagram of an exemplary cluster system including computing devices and virtual machines.

FIG. 3 is a block diagram of an exemplary cluster system 300 of hosts 305 and virtual machines (VMs) 235. Cluster system 300 includes a load balancing domain 310 with a first host $305_1$, a second host $305_2$, a third host $305_3$, and a fourth host $305_4$. Each host 305 executes one or more software application instances. For example, first host $305_1$ executes first VM $235_1$, second VM $235_2$, and third VM $235_3$, and fourth host $305_4$ executes fourth VM $235_4$. It is contemplated that load balancing domain 310 may include any quantity of hosts 305 executing any quantity of software application instances.

Hosts 305 communicate with each other via a network 315. Cluster system 300 also includes a management server 320, which communicates with hosts 305 via network 315. In exemplary embodiments, management server 320 monitors and controls hosts 305. For example, management server 320 may monitor the computing load of each host 305 and may further migrate a VM 235 between hosts 305 based on the computing load. Cluster system 300 may also include a user device 325 that communicates with management server 320 and/or hosts 305.

Although management server 320 is shown outside load balancing domain 310, the functions of management server 320 may be incorporated into load balancing domain 310. For example, management server 320 may be included in load balancing domain 310. Alternatively, the functions described with reference to management server 320 may be performed by one or more VMs 235 executed by one or more hosts 305 in load balancing domain 310. Hosts 305, management server 320, and user device 325 may be computing devices 100 (shown in FIG. 1).

In exemplary embodiments, each host 305 in load balancing domain 310 provides host information to management server 320. The host information includes, for example, the software application instances being executed by a host 305, computing resources allocated to software application instances being executed by the host 305, one or more host load metrics representing a computing load associated with the host 305, and/or events, such as the initiation of an execution of a software application instance or a termination of a software application instance by the host 305. Management server 320 receives the host information from hosts 305 in load balancing domain 310 and may provide the host information for presentation to a user at management server 320 and/or user device 325. For example, referring also to FIG. 1, management server 320 may present the host information using a presentation device 106 and/or transmit, using network communication interface 112, the host information to user device 325 or another computing device 100 for presentation.

Figure 4:
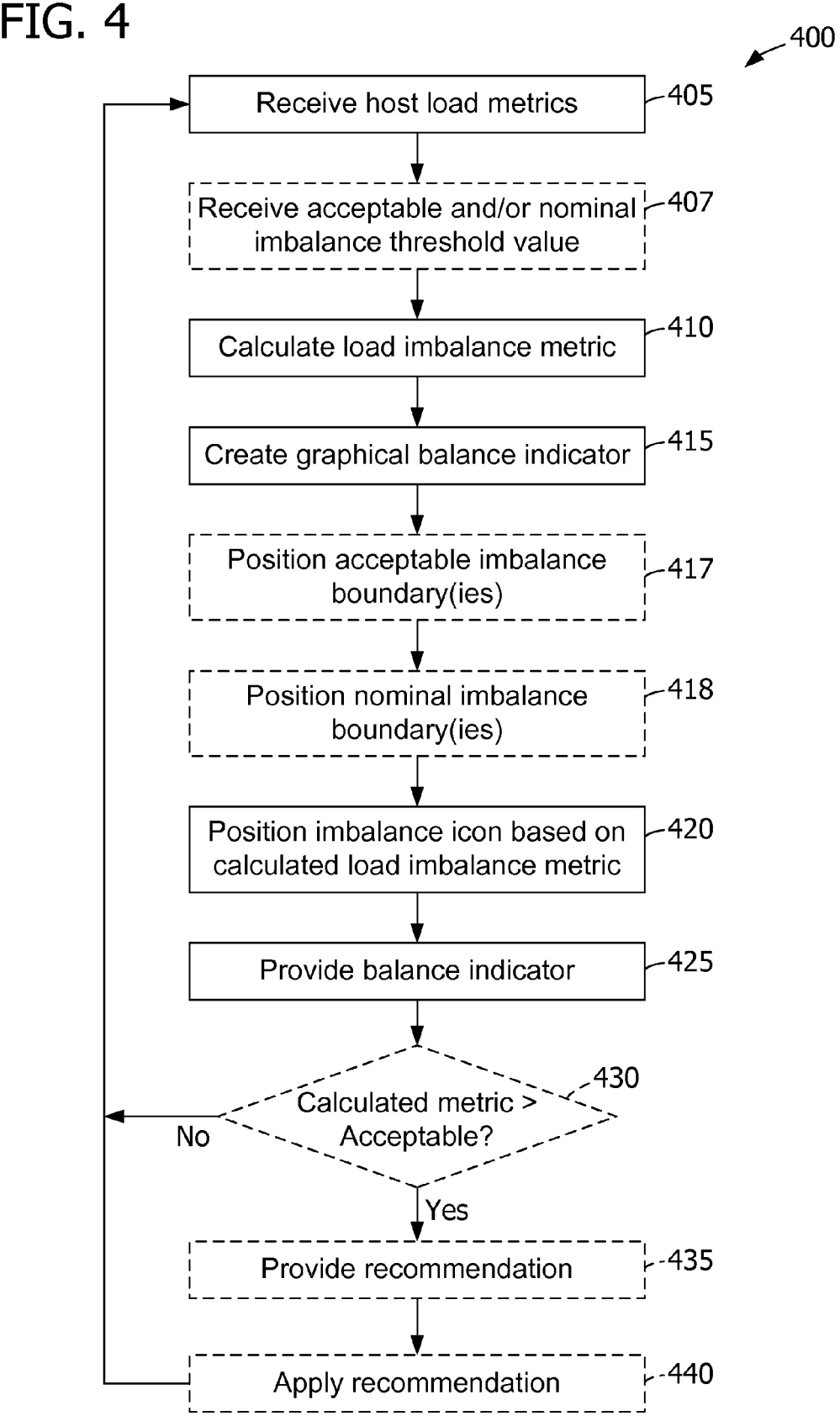
FIG. 4 is a flowchart of an exemplary method performed by a management server, such as the management server shown in FIG. 3

FIG. 4 is a flowchart of an exemplary method 400 performed by a management server, such as management server 320. Although the operations in method 400 are described with reference to management server 320, it is contemplated that any portion of such operations may be performed by any computing device 100, including user device 325. For example, graphical balance indicators, as described below with reference to FIGS. 5-10, may be created by management server 320 and transmitted by management server 320 to user device 325 for display to a user.

Referring to FIGS. 3 and 4, management server 320 receives 405 a plurality of host load metrics. Each host load metric corresponds to a host 305 of a plurality of hosts (e.g., hosts 305 in load balancing domain 310). In exemplary embodiments, each host 305 in load balancing domain 310 transmits host load metrics to management server 320 via network 315.

Each host load metric represents computing resource utilization of the corresponding host 305. For example, a host load metric may represent memory utilization, processor utilization, network utilization, and/or storage utilization of the corresponding host 305. In exemplary embodiments, host load metrics are expressed numerically. For example, processor utilization may be expressed as a percentage of processor capacity used by software application instances (e.g., VMs) executed by the host 305, and network utilization may be expressed as the quantity of data being transmitted and/or received by the host 305 via a network (e.g., network 315). Further, host load metrics may be expressed as absolute values (e.g., processor megahertz used by executing processes) and/or as relative values (e.g., a proportion of available processor megahertz used by executing processes).

A host load metric may be an instantaneous value, such as a single reading provided by resource monitoring software (e.g., an operating system and/or application software) executed by a host 305. Alternatively, a host load metric may be calculated as a moving average of such readings provided over a predetermined period of time (e.g., one second, five seconds, or thirty seconds).

Management server 320 calculates 410 a load imbalance metric based on the received host load metrics. The load imbalance metric represents variability within the host load metrics. For example, the load imbalance metric may represent the range, the variance, and/or the standard deviation of the host load metrics. In exemplary embodiments, management server 320 calculates 410 a standard deviation of the host load metrics.

Figure 5:
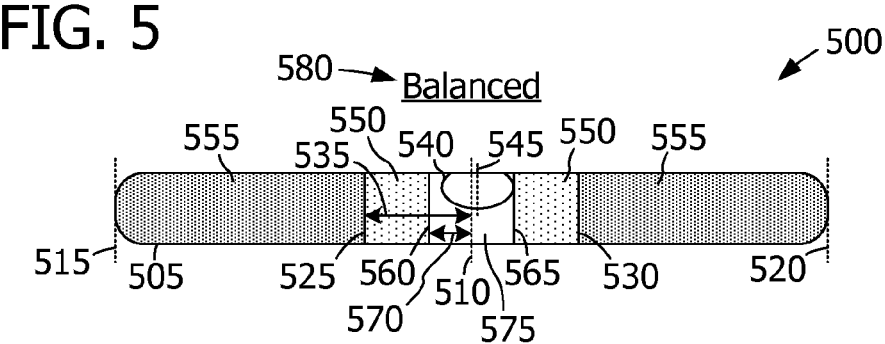
FIG. 5 is an exemplary tubular graphical balance indicator.

Management server 320 creates 415 a graphical balance indicator. FIG. 5 is an exemplary tubular graphical balance indicator 500. In exemplary embodiments, indicator 500 is presented to a user by management server 320 and/or by user device 325 (e.g., using presentation device 106).

Indicator 500 includes a tube 505 with a balance position, such as a center 510, that is equidistant from a first periphery 515 on a first (e.g., left) side of center 510 and a second periphery 520 on a second (e.g., right) side of center 510 that is opposite the first side. Indicator 500 also includes a first acceptable imbalance boundary 525 (referred to herein as a left acceptable imbalance boundary) that is positioned on the first side, between center 510 and first periphery 515, and a second acceptable imbalance boundary 530 (referred to herein as a right acceptable imbalance boundary) that is positioned on the second side, between center 510 and second periphery 520. Left acceptable imbalance boundary 525 and right acceptable imbalance boundary 530 are offset from center 510 by a boundary offset distance 535.

Referring to FIGS. 3, 4, and 5, management server 320 positions 420 within indicator 500 an imbalance icon, such as bubble icon 540, based on the calculated load imbalance metric. In exemplary embodiments, center 510 of indicator 500 represents a load imbalance metric (e.g., a standard deviation) of zero, and bubble icon 540 is positioned 420 at a distance from center 510 that is positively correlated with (e.g., directly proportional to) the calculated load imbalance metric.

Left acceptable imbalance boundary 525 and right acceptable imbalance boundary 530 represent an acceptable imbalance threshold value. The position of bubble icon 540 represents the proximity of the calculated load imbalance metric to the acceptable imbalance threshold value. For example, when the calculated load imbalance metric is less than the acceptable imbalance threshold value, a center 545 of bubble icon 540 appears in an acceptable imbalance area 550 between left acceptable imbalance boundary 525 and right acceptable imbalance boundary 530, indicating an acceptable imbalance condition in load balancing domain 310. Conversely, when the calculated load imbalance metric exceeds the acceptable imbalance threshold value, center 545 of bubble icon 540 appears in an excessive imbalance area 555 outside left acceptable imbalance boundary 525 and right acceptable imbalance boundary 530 (e.g., between left acceptable imbalance boundary 525 and first periphery 515 or between right acceptable imbalance boundary 530 and second periphery 520), indicating an excessive imbalance condition in load balancing domain 310.

The acceptable imbalance threshold value may be a static value stored as a configuration parameter by management server 320. Alternatively, the acceptable imbalance threshold value may be received 407 by management server 320 from a user. For example, management server 320 may receive 407 a numeric value from the user and set the acceptable imbalance threshold value to the received numeric value. Alternatively, management server 320 may receive 407 an adjustment of left acceptable imbalance boundary 525 or right acceptable imbalance boundary 530 from the user, as described below with reference to FIG. 8. In some embodiments, the acceptable imbalance threshold value is expressed as a standard deviation value, such as 0.2, 0.4, or 0.5.

In exemplary embodiments, management server 320 positions 420 a center 545 of bubble icon 540 relative to center 510 and either left acceptable imbalance boundary 525 or right acceptable imbalance boundary 530 based on the calculated load imbalance metric. Indicator 500 is provided 425 for presentation to a user. For example, management server 320 may display indicator 500 to a user, or management server 320 may transmit indicator 500 to user device 325, and user device 325 may display indicator 500 to a user. Alternatively, in some embodiments, management server 320 transmits the calculated load imbalance metric and the acceptable imbalance threshold to user device 325, and user device 325 creates 415 indicator 500, positions 420 bubble icon 540 within indicator 500, and displays indicator 500 to a user.

In some embodiments, management server 320 positions 420 center 545 of bubble icon 540 based on a ratio of the calculated load imbalance metric to the acceptable imbalance threshold value. For example, if the acceptable imbalance threshold value is equal to a standard deviation of 0.2, and the calculated load imbalance metric is a standard deviation of 0.1, the ratio is 0.5 (0.1/0.2), and management server 320 may determine a displacement position equal to the ratio (0.5) multiplied by boundary offset distance 535. Management server 320 positions 420 center 545 of bubble icon 540 at the displacement distance from center 510 on either the first side or the second side of center 510.

In some embodiments, boundary offset distance 535 and/or the positions of left acceptable imbalance boundary 525 and right acceptable imbalance boundary 530 are statically defined. In other embodiments, management server 320 positions 417 left acceptable imbalance boundary 525 and right acceptable imbalance boundary 530 based on the acceptable imbalance threshold value. For example, indicator 500 may be associated with a scale relating a distance to a load imbalance metric, such as fifty pixels per 0.1 units of standard deviation, or two centimeters per 0.1 units of standard deviation. In such embodiments, management server 320 calculates boundary offset distance 535 based on the acceptable imbalance threshold value, such as by multiplying the acceptable imbalance threshold value by the defined scale. Management server 320 positions 417 left acceptable imbalance boundary 525 and right acceptable imbalance boundary 530 at the calculated boundary offset distance 535 from center 510.

In addition to an excessive imbalance condition or an acceptable imbalance condition, indicator 500 may be capable of indicating a nominal imbalance condition. In exemplary embodiments, management server 320 positions 418 within indicator 500 a first nominal imbalance boundary 560 (referred to herein as a left nominal imbalance boundary) between center 510 and left acceptable imbalance boundary 525 and a second nominal imbalance boundary 565 (referred to herein as a right nominal imbalance boundary) between center 510 and right acceptable imbalance boundary 530. Left nominal imbalance boundary 560 and right nominal imbalance boundary 565 are positioned 418 at a boundary offset distance 570 from center 510 that represents a nominal imbalance threshold value that is less than the acceptable imbalance threshold value. For example, if the calculated load imbalance metric is expressed as a standard deviation value, the nominal imbalance threshold value may be equal to a standard deviation of 0.02, 0.05. or 0.1.

Like the acceptable imbalance threshold value, the nominal imbalance threshold value may be statically defined or may be received 407 from a user. In exemplary embodiments, when the calculated load imbalance metric is less than the nominal imbalance threshold value, center 545 of bubble icon 540 appears within a nominal imbalance area 575.

In exemplary embodiments, management server 320 graphically distinguishes excessive imbalance area 555 from acceptable imbalance area 550 and from nominal imbalance area 575, if present. For example, graphical distinction may be accomplished using a background pattern, a background color, an animation, and/or any other method of visually differentiating user interface elements from one another. In one example, nominal imbalance area 575 is displayed in green, acceptable imbalance area 550 is displayed in yellow, and excessive imbalance area 555 is displayed in red.

Figure 6:
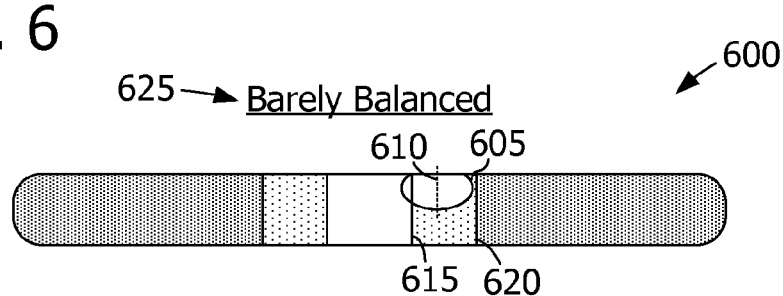
FIG. 6 is an exemplary tubular graphical balance indicator representing a computing cluster in an acceptable balance condition.
Figure 7:
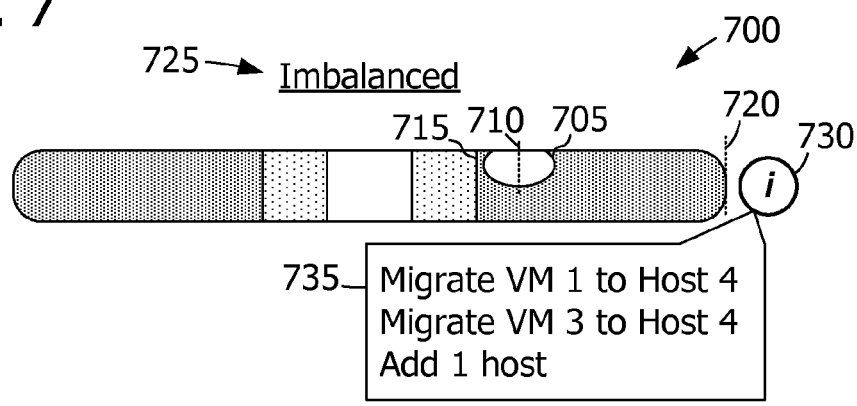
FIG. 7 is an exemplary tubular graphical balance indicator representing a computing cluster in an excessive imbalance condition.

Indicator 500 may also include a status label 580 that includes a textual description of the condition of load balancing domain 310. For example, when the calculated load imbalance metric is less than the nominal imbalance threshold value, status label 580 may indicate a status of "Balanced." FIG. 6 is an exemplary tubular graphical balance indicator 600 representing a computing cluster in a nominal imbalance condition. Indicator 600 includes a bubble icon 605 with a center 610 between a nominal imbalance boundary 615 and an acceptable imbalance boundary 620. The position of bubble icon 605 represents a calculated load imbalance metric between a nominal imbalance threshold value an acceptable imbalance threshold value. Accordingly, indicator 600 also includes a status label 625 indicating a status of "Barely Balanced." FIG. 7 is an exemplary tubular graphical balance indicator 700 representing a computing cluster in an excessive imbalance condition. Indicator 700 includes a bubble icon 705 with a center 710 between an acceptable imbalance boundary 715 and a periphery 720. The position of bubble icon 705 represents a calculated load imbalance metric that is greater than an acceptable imbalance threshold value. Accordingly, indicator 700 also includes a status label 725 indicating a status of "Imbalanced."

A graphical balance indicator, such as indicator 700, may enable a user to view and/or apply load balancing recommendations. Referring to FIGS. 3 and 4, in exemplary embodiments, management server 320 compares 430 the calculated load imbalance metric to the acceptable imbalance threshold value. When the calculated load imbalance metric exceeds the acceptable imbalance threshold value, management server 320 determines and provides 435 one or more load balancing recommendations to the user. A load balancing recommendation indicates a remedial measure that may correct an excessive imbalance condition. For example, a load balancing recommendation may include the addition of one or more hosts 305 to load balancing domain 310 or a migration of a virtual machine 235 from one host 305 (e.g., first host $305_1$) that is associated with a first host load metric to another host 305 (e.g., fourth host $305_4$) that is associated with a second host load metric that is less than the first host load metric.

Referring to FIGS. 3, 4, and 7, indicator 700 includes an information icon 730. When a user selects information icon 730, indicator 700 displays one or more recommendations 735 provided 435 by management server 320. When the user selects a recommendation 735, management server 320 applies 440 the selected recommendation. For example, management server 320 may initiate a migration of a VM 235 between hosts 305 or add one or more hosts 305 to load balancing domain 310 (e.g., by powering on the hosts 305). In addition, or alternatively, indicator 700 may display one or more fault messages, such as VM migration errors and/or communication errors, when the user selects information icon 730.

In some embodiments, a user may define threshold values, such as the acceptable imbalance threshold value or the nominal imbalance threshold value. For example, management device 320 and/or user device 325 may receive 407 a nominal imbalance value and/or an acceptable imbalance threshold value from a user. In some embodiments, threshold values are entered by a user as numeric values or selected from a list of options. Management device 320 positions 417 acceptable imbalance boundaries and/or positions 418 nominal imbalance boundaries based on the received threshold values.

Figure 8:
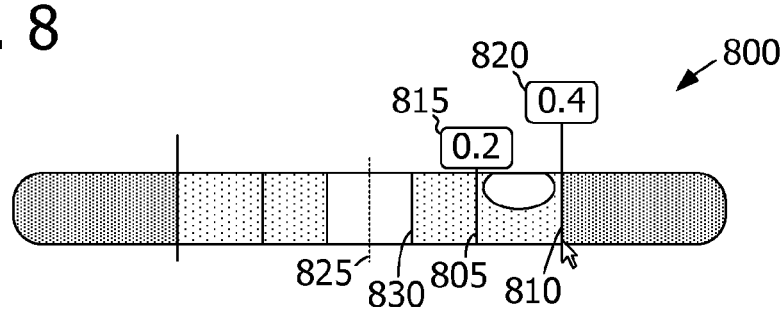
FIG. 8 is an exemplary tubular graphical balance indicator that allows adjustment of an acceptable imbalance threshold value.

FIG. 8 is an exemplary tubular graphical balance indicator 800 that allows adjustment of an acceptable imbalance threshold value. Indicator 800 includes an acceptable imbalance boundary 805. When a user selects acceptable imbalance boundary 805, indicator 800 displays a movable boundary 810. The user may adjust the position of acceptable imbalance boundary 805 by moving movable boundary 810. In exemplary embodiments, indicator displays a current threshold value 815 associated with acceptable imbalance boundary 805 and a new threshold value 820 associated with movable boundary 810. New threshold value 820 is modified as the user adjusts the position of movable boundary 810 to reflect a load imbalance metric corresponding to the distance between movable boundary 810 and a center 825 of indicator 800. When the user de-selects movable boundary 810, the acceptable imbalance threshold value is set to new threshold value 820, and indicator 800 is redisplayed, with acceptable imbalance boundary 805 at the position of movable boundary 810 when user de-selected movable boundary 810. Indicator 800 may similarly allow adjustment of a nominal imbalance threshold value represented by nominal imbalance boundary 830.

Referring to FIGS. 3 and 4, in some embodiments, management server 320 performs method 400 repeatedly (e.g., continually, periodically, or upon request). Such embodiments enable management server 320 and/or user device 325 to indicate changes to the condition of load balancing domain 310 over time. For example, management server 320 may provide 425 a graphical balance indicator at a first time and apply 440 a load balancing recommendation selected by the user. After the load balancing recommendation is applied 440, the condition of the cluster may change. For example, if a virtual machine is migrated from a host associated with a relatively high load metric to a host associated with a relatively low metric, the computing load may become more uniformly distributed.

In such an example, management server 320 calculates 410 the load imbalance metric at a second time after the load balancing recommendation is applied, resulting in a different (e.g., lower) load imbalance metric than was calculated 410 at the first time. Management server 320 positions 420 the imbalance icon based on the newly calculated load imbalance metric, thereby adjusting the position of the imbalance icon within the graphical balance indicator.

Figure 9:
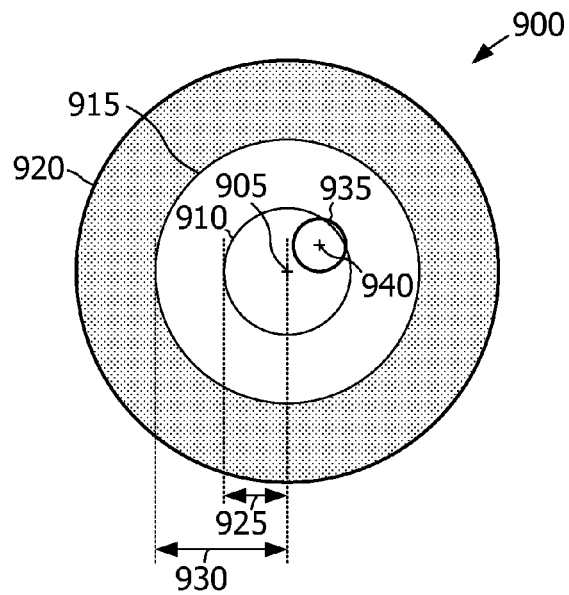
FIG. 9 is an exemplary bull's eye graphical balance indicator.

While embodiments are described above with reference to tubular graphical balance indicators, other forms of graphical balance indicators including a balance position and one or more boundaries are contemplated, such as a bull's eye graphical balance indicator and a teeter-totter graphical balance indicator. FIG. 9 is an exemplary bull's eye graphical balance indicator 900. Indicator 900 includes a balance position, such as center 905, a nominal imbalance boundary 910, an acceptable imbalance boundary 915, and a periphery 920. Nominal imbalance boundary 910 is offset from center 905 by a boundary offset distance 925, and acceptable imbalance boundary 915 is offset from center 905 by a boundary offset distance 930. In exemplary embodiments, boundary offset distance 925 is based on a nominal imbalance threshold value, and boundary offset distance 930 is based on an acceptable imbalance threshold value.

An imbalance icon, such as a bubble icon 935, is positioned within indicator 900 relative to center 905, nominal imbalance boundary 910, and acceptable imbalance boundary 915 based on a calculated load imbalance metric. For example, a center 940 of bubble icon 935 may be positioned between center 905 and nominal imbalance boundary 910 to indicate that the calculated load imbalance metric is less than the nominal imbalance threshold value.

Figure 10:
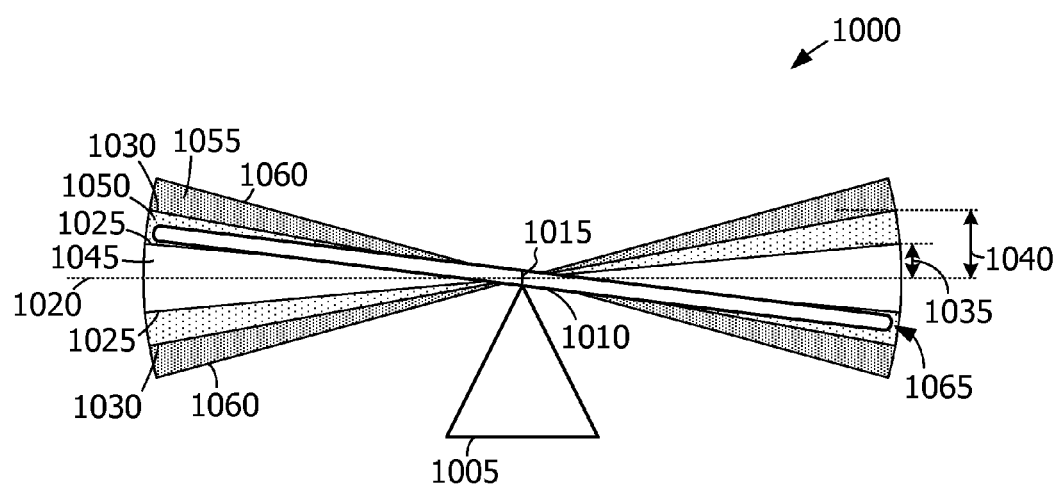
FIG. 10 is an exemplary teeter-totter graphical balance indicator.

FIG. 10 is an exemplary teeter-totter graphical balance indicator 1000. Indicator 1000 includes a fulcrum 1005 and an imbalance icon, such as a beam 1010, with a center 1015 atop fulcrum 1005. Indicator 1000 includes a balance position 1020, which may also be referred to as a center, that represents a load imbalance metric of zero. Indicator 1000 also includes nominal imbalance boundaries 1025 and acceptable imbalance boundaries 1030. Nominal imbalance boundaries 1025 are offset from balance position 1020 by a boundary offset distance 1035, and acceptable imbalance boundaries 1030 are offset from balance position 1020 by a boundary offset distance 1040. In exemplary embodiments, boundary offset distance 1035 is based on a nominal imbalance threshold value, and boundary offset distance 1040 is based on an acceptable imbalance threshold value. Nominal imbalance areas 1045 are defined between balance position 1020 and nominal imbalance boundaries 1025. Acceptable imbalance areas 1050 are defined between nominal imbalance boundaries 1025 and acceptable imbalance boundaries 1030. Excessive imbalance areas 1055 are defined between acceptable imbalance boundaries 1030 and peripheries 1060 of indicator 1000.

Beam 1010 is positioned relative to balance position 1020, a nominal imbalance boundary 1025, and/or an acceptable imbalance boundary 1030 based on a calculated load imbalance metric. For example, a tip 1065 of beam 1010 may be positioned between a nominal imbalance boundary 1025 and an acceptable imbalance boundary 1030 (e.g., within an acceptable imbalance area 1050) to indicate that the calculated load imbalance metric is between the nominal imbalance threshold value and the acceptable imbalance threshold value.

Embodiments described herein facilitate providing a graphical balance indicator that represents the distribution of computing resource utilization, or "load," within a computing cluster. Computing resource utilization may include, for example, processor utilization, memory (e.g., random access memory or primary memory) utilization, storage (e.g., mass storage or secondary memory) utilization, and/or network utilization. Readings or calculations of computing resource utilization by a host are expressed as host load metrics. Further, an aggregate host load metric may be calculated by combining (e.g., averaging or summing) host load metrics representing a plurality of computing resources (e.g., processor utilization and memory utilization), and a load imbalance metric may be calculated based on aggregate host load metrics corresponding to a plurality of hosts. In addition, or alternatively, a load imbalance metric may be calculated for each of a plurality of computing resources. For example, a processing load imbalance metric and a memory load imbalance metric may be calculated and presented as separate graphical load indicators, or as separate imbalance icons within a single graphical balance indicator.

Exemplary Operating Environment

The monitoring and execution of software application instances in a load balancing domain as described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules, or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the disclosure are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The operations illustrated and described herein may be implemented as software instructions encoded on a computer-readable medium, in hardware programmed or designed to perform the operations, or both. For example, aspects of the disclosure may be implemented as a system on a chip.

The embodiments illustrated and described herein as well as embodiments not specifically described herein but within the scope of aspects of the disclosure constitute exemplary means for maintaining high availability of software application instances, such as virtual machines.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for presenting a load balance in a computing cluster that includes a plurality of hosts executing one or more virtual machines (VMs), the system comprising:
a memory for storing a plurality of host load metrics, wherein each host load metric corresponds to a host of the plurality of hosts and represents a computing resource utilization of VMs executed by the corresponding host; and
a processor coupled to the memory and programmed to:
calculate a load imbalance metric based on the plurality of host load metrics, wherein the load imbalance metric represents variability of the host load metrics;
create a graphical balance indicator bar comprising a center, a first acceptable imbalance boundary that is positioned on a first side of the center, and a second acceptable imbalance boundary that is positioned on a second side of the center opposite the first side, wherein the first and second acceptable imbalance boundaries are offset from the center by a boundary offset distance that is based on an acceptable imbalance threshold value;
position, based on the calculated load imbalance metric, an imbalance icon in the graphical balance indicator bar relative to the center and one or more of the following: the first acceptable imbalance boundary and the second acceptable imbalance boundary;
generate a load balance recommendation when the imbalance icon exceeds the boundary offset distance such that a center of the imbalance icon is not within the first acceptable imbalance boundary or the second acceptable imbalance boundary, the load balance recommendation comprising adding a defined number of hosts to the computing cluster;
apply the load balancing recommendation when the load balancing recommendation is selected by the user; and
re-position, based on applying the load balancing recommendation, the imbalance icon in the graphical balance indicator bar.

2. The system of claim 1, wherein the processor is programmed to calculate the load imbalance metric by calculating a standard deviation of the host load metrics.

3. The system of claim 2, wherein the center of the graphical balance indicator bar represents a standard deviation of zero, the boundary offset distance represents an acceptable standard deviation, and the processor is programmed to position the imbalance icon at a distance from the center that represents the calculated standard deviation.

4. The system of claim 1, wherein the processor is further programmed to position in the graphical balance indicator bar a first nominal imbalance boundary between the center and the first acceptable imbalance boundary and a second nominal imbalance boundary between the center and the second acceptable imbalance boundary, wherein the first and second nominal imbalance boundaries are positioned at a distance from the center that represents a nominal imbalance threshold value.

5. The system of claim 1, wherein the processor is programmed to position an imbalance icon in the graphical balance indicator bar by positioning a bubble icon in the graphical balance indicator bar.

6. The system of claim 1, further comprising an input interface coupled to the processor and configured to receive the acceptable imbalance threshold value from a user, wherein the processor is programmed to position the first acceptable imbalance boundary and the second acceptable imbalance boundary based on the received acceptable imbalance threshold value.

7. The system of claim 6, further comprising a presentation device coupled to the processor and configured to present the graphical balance indicator bar, wherein the input interface is configured to receive the acceptable imbalance threshold value by receiving an adjustment to the position of one or more of the following: the first acceptable imbalance boundary and the second acceptable imbalance boundary.

8. A method comprising:
receiving, by a computing device, a plurality of host load metrics, wherein each host load metric corresponds to a host of the plurality of hosts and represents a computing resource utilization of the corresponding host;
calculating, by the computing device, a load imbalance metric representing a variability of the host load metrics;
creating, by the computing device, a graphical balance indicator bar comprising a balance position and an acceptable imbalance boundary that is offset from the balance position by a boundary offset distance that is based on an acceptable imbalance threshold value;
positioning, by the computing device, an imbalance icon in the graphical balance indicator bar relative to the balance position and the acceptable imbalance boundary based on the calculated load imbalance metric;
presenting a load balancing recommendation when the calculated load imbalance metric exceeds the acceptable imbalance threshold value, wherein the load balancing recommendation comprising adding a defined number of hosts to the plurality of hosts;
applying the load balancing recommendation when the load balancing recommendation is selected by the user; and
re-positioning, based on applying the load balancing recommendation, the imbalance icon in the graphical balance indicator bar.

9. The method of claim 8, wherein receiving the host load metrics comprises receiving host load metrics that represent a memory utilization of a corresponding host and a processor utilization of the corresponding host.

10. The method of claim 8, wherein receiving the host load metrics comprises receiving host load metrics that represent a network utilization of a corresponding host and a storage utilization of the corresponding host.

11. The method of claim 8, wherein calculating the load imbalance metric comprises calculating a standard deviation of the host load metrics, and the balance position of the graphical balance indicator bar represents a standard deviation of zero, the method further comprising determining the boundary offset distance based on an acceptable standard deviation.

12. The method of claim 8, wherein the balance position of the graphical balance indicator bar represents an imbalance metric of zero, and positioning the imbalance icon comprises positioning the imbalance icon at a distance from the balance position that is directly proportional to the calculated load imbalance metric.

13. The method of claim 8, further comprising positioning in the graphical balance indicator bar a nominal imbalance boundary between the balance position and the acceptable imbalance boundary, wherein the nominal imbalance boundary is positioned at a distance from the balance position that represents a nominal imbalance threshold value.

14. One or more non-transitory computer storage media having computer-executable components comprising:

an imbalance calculation component that when executed causes at least one processor to calculate a load imbalance metric based on a plurality of host load metrics, wherein each host load metric corresponds to a host of a plurality of hosts and represents a computing resource utilization of the corresponding host; and a graphical representation component that when executed causes at least one processor to:

create a graphical balance indicator bar comprising a balance position and an acceptable imbalance boundary that is offset from the balance position, wherein the balance position represents a load imbalance metric of zero;

position an imbalance icon in the graphical balance indicator bar relative to the balance position and the acceptable imbalance boundary based on the calculated load imbalance metric, wherein the position of the imbalance icon represents a proximity of the calculated load imbalance metric to an acceptable imbalance threshold value;

provide the graphical balance indicator bar for presentation to a user present a load balancing recommendation when the calculated load imbalance metric exceeds the acceptable imbalance threshold value, wherein the load balancing comprises adding a defined number of hosts to the plurality of hosts;

apply the load balancing recommendation when the load balancing recommendation is selected by the user; and re-position, based on applying the load balancing recommendation, the imbalance icon in the graphical balance indicator bar.

15. The non-transitory computer storage media of claim 14, wherein the graphical representation component further causes the processor to position the acceptable imbalance boundary at a boundary offset distance from the balance position, wherein the boundary offset distance represents the acceptable imbalance threshold value.

16. The non-transitory computer storage media of claim 14, wherein the graphical representation component causes the processor to determine the position of the imbalance icon based on a ratio of the calculated load imbalance metric to the acceptable imbalance threshold value.

17. The non-transitory computer storage media of claim 14, further comprising a recommendation component that when executed causes at least one processor to:

determine a load balancing recommendation when the calculated load imbalance metric exceeds the acceptable imbalance threshold value, wherein the load balancing recommendation indicates a migration of a virtual machine from a first host associated with a first host load metric to one of the added defined number of hosts;

provide the load balancing recommendation to a user; and apply the load balancing recommendation when the load balancing recommendation is selected by the user.

18. The non-transitory computer storage media of claim 17, wherein the graphical balance indicator bar is provided for presentation at a first time before the load balancing recommendation is applied, and the graphical representation component further causes the processor to adjust the position of the imbalance icon based on a load imbalance metric calculated by the imbalance calculation component at a second time after the load balancing recommendation is applied.

19. The non-transitory computer storage media of claim 15, wherein the graphical representation component further causes the processor to graphically distinguish an acceptable imbalance area between the balance position and the acceptable imbalance boundary from an excessive imbalance area between the acceptable imbalance boundary and an periphery of the graphical balance indicator bar.

20. The system of claim 1, wherein the load balance recommendation further comprises the option of migrating a defined number of virtual machines from a first host to a second host.

* * * * *